(12) United States Patent
Behravan et al.

(10) Patent No.: US 10,021,717 B2
(45) Date of Patent: *Jul. 10, 2018

(54) METHODS AND ARRANGEMENTS IN A TELECOMMUNICATION SYSTEM FOR CONFIGURING TRANSMISSION OF SOUNDING REFERENCE SIGNALS

(71) Applicant: Telefonaktiebolaget LM Ericsson (publ), Stockholm (SE)

(72) Inventors: Ali Behravan, Stockholm (SE); David Astely, Bromma (SE); George Jöngren, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,512

(22) Filed: Dec. 20, 2016

(65) Prior Publication Data

US 2017/0104566 A1 Apr. 13, 2017

Related U.S. Application Data

(63) Continuation of application No. 13/370,649, filed on Feb. 10, 2012, now Pat. No. 9,565,696, which is a
(Continued)

(51) Int. Cl.
*H04W 72/12* (2009.01)
*H04L 5/00* (2006.01)
(Continued)

(52) U.S. Cl.
CPC ......... *H04W 72/1289* (2013.01); *H04L 5/005* (2013.01); *H04L 5/0048* (2013.01);
(Continued)

(58) Field of Classification Search
CPC .......... H04W 72/1289; H04W 72/042; H04W 74/006; H04W 72/14; H04L 5/0092;
(Continued)

(56) References Cited

U.S. PATENT DOCUMENTS 9,565,696 B2 * 2/2017 Behravan ................ H04L 5/005
2006/0035643 A1 2/2006 Vook et al.
(Continued)

FOREIGN PATENT DOCUMENTS

JP 2007510390 A 4/2007
JP 2011077884 A 4/2011
(Continued)

OTHER PUBLICATIONS

Texas Instruments, "Considerations on Aperiodic SRS", 3GPP TSG RAN WG1 #60, Feb. 22-26, 2010, San Francisco, US, R1-101094.
(Continued)

*Primary Examiner* — Joshua Kading
(74) *Attorney, Agent, or Firm* — Coats & Bennett, PLLC

(57) ABSTRACT

A base station in a communications network broadcasts a cell-specific instruction to a plurality of mobile terminals in a cell served by the base station. The cell-specific instruction indicates that an uplink symbol has been semi-statically configured for aperiodic sounding reference signal (SRS) transmission over multiple subsequent subframes. The base station dynamically determines that a first mobile terminal of the plurality of mobile terminals is to use the uplink symbol for SRS transmission in a given one of the multiple subsequent subframes. In response, the base station signals a first terminal-specific instruction to the first mobile terminal. The first terminal-specific instruction is distinct from the cell-specific instruction and indicates that the first mobile terminal is to use the uplink symbol for SRS transmission in the given subframe.

20 Claims, 11 Drawing Sheets

Related U.S. Application Data continuation of application No. 13/256,595, filed as application No. PCT/SE2010/050685 on Jun. 18, 2010, now Pat. No. 8,817,719.

(60) Provisional application No. 61/306,606, filed on Feb. 22, 2010.

(51) Int. Cl.
  *H04W 72/04* (2009.01)
  *H04W 74/00* (2009.01)
  *H04W 72/14* (2009.01)
  *H04L 27/26* (2006.01)
  *H04L 25/02* (2006.01)

(52) U.S. Cl.
  CPC .......... *H04L 5/0092* (2013.01); *H04L 5/0094* (2013.01); *H04L 27/2611* (2013.01); *H04W 72/042* (2013.01); *H04W 72/14* (2013.01); *H04W 74/006* (2013.01); *H04L 25/0224* (2013.01)

(58) Field of Classification Search
  CPC . H04L 5/005; H04L 27/2611; H04L 25/0224; H04L 5/0048; H04L 5/0094
  See application file for complete search history.

(56) References Cited

U.S. PATENT DOCUMENTS

| | | |
|---|---|---|
| 2008/0267269 A1 | 10/2008 | Enescu et al. |
| 2009/0042615 A1 | 2/2009 | Teo et al. |
| 2009/0109908 A1 | 4/2009 | Bertrand et al. |
| 2010/0103902 A1 | 4/2010 | Kim et al. |
| 2011/0199944 A1 | 8/2011 | Chen et al. |
| 2012/0076105 A1 | 3/2012 | Yang |

FOREIGN PATENT DOCUMENTS

| | | |
|---|---|---|
| JP | 2013062848 A | 4/2013 |
| WO | 2008115112 A1 | 9/2008 |
| WO | 2008120925 A1 | 10/2008 |

OTHER PUBLICATIONS

ASUSTeK, "Discussion on Dynamic Aperiodic Sounding", 3GPP TSG RAN WG1 Meeting #60, Feb. 22-26, 2010, San Francisco, US, R1-100997.

Nokia Siemens Networks, et al., "UL sounding", 3GPP TSG RAN WG1 Meeting #49, May 7-11, 2007, Kobe, Japan, R1-072296.

Nokia Siemens Networks, et al., "Channel sounding enhancements for LTE-Advanced", 3GPP TSG RAN WG1 Meeting #59, Nov. 9-13, 2009, Jeju, Korea, R1-094653.

Samsung, "SRS Transmission Issues for LTE-A", 3GPP TSG RAN WG1 #55bis, Jan. 14-18, 2009, Ljubljana, Slovenia, R1-090100.

Samsung, "Configuring SRS Transmissions in Rel. 10", 3GPP TSG RAN WG1 #59bis, Jan. 19-23, 2010, Valencia, Spain, R1-100133.

Ericsson et al., "Further Discussions on SRS Enhancements", 3GPP TSG-RAN WG1 #60, Feb. 22-26, 2010, San Francisco, US, R1-100860.

* cited by examiner

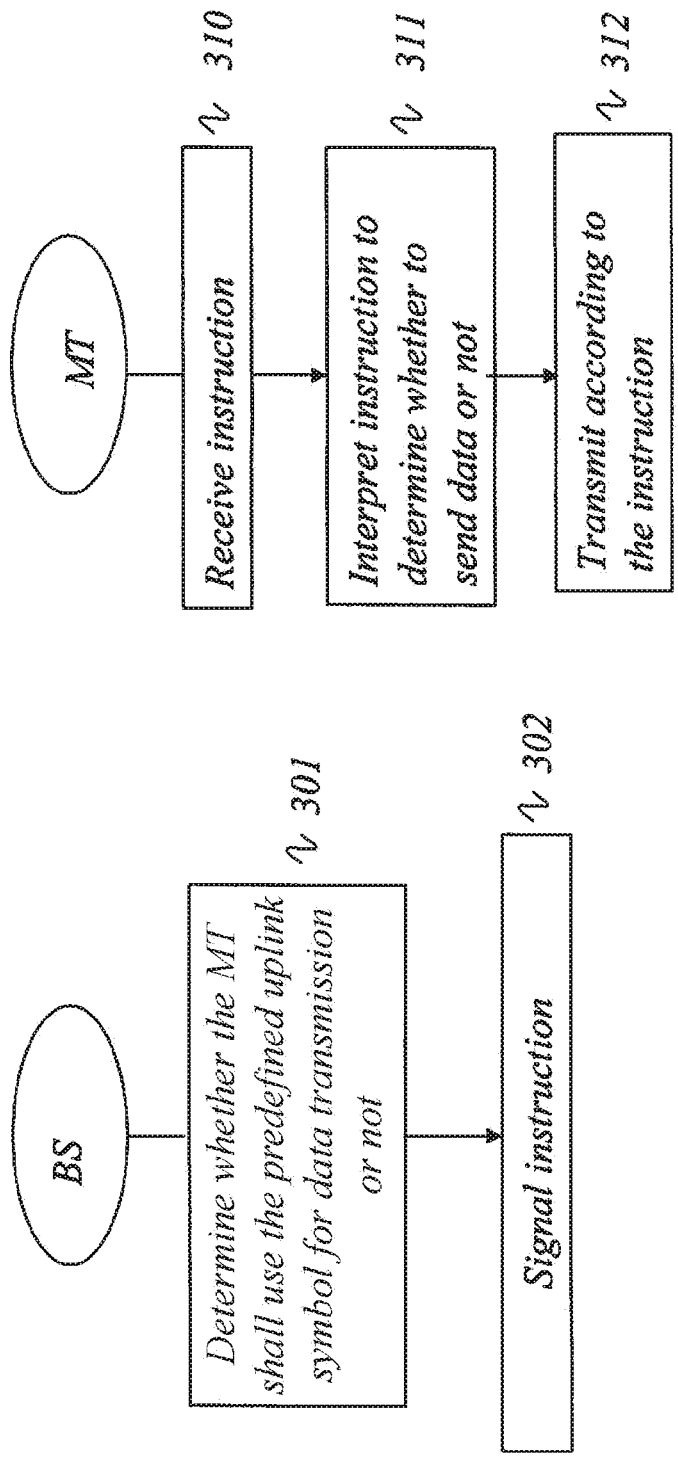

METHODS AND ARRANGEMENTS IN A TELECOMMUNICATION SYSTEM FOR CONFIGURING TRANSMISSION OF SOUNDING REFERENCE SIGNALS

RELATED APPLICATIONS

This application is a continuation application of U.S. patent application Ser. No. 13/370,649 filed Feb. 10, 2012, which is a continuation application of U.S. patent application Ser. No. 13/256,595 filed Sep. 14, 2011 (now U.S. Pat. No. 8,817,719), which is a U.S. National Stage application of International Patent App. No. PCT/SE2010/050,685 filed Jun. 18, 2010, which in turn claims priority from U.S. Provisional App. No. 61/306,606 filed Feb. 22, 2010, the disclosures of all of which are incorporated by reference herein in their entirety.

TECHNICAL FIELD

The present invention relates to methods and arrangements for transmission of sounding reference symbols (SRS).

BACKGROUND

Sounding reference signals (SRS) are one type of reference signals that are transmitted by mobile terminals so that the base station can estimate the uplink channels used by the mobile terminal. In the context of Long Term Evolution (LTE) the mobile terminals are referred to as User Equipments (UEs) and the base stations are referred to eNBs. The channel estimates may be used for uplink scheduling and link adaptation but also for downlink multiple antenna transmission, especially in case of TDD (Time Division Duplex) in LTE where the uplink and downlink use the same frequencies. The sounding reference signals are in part defined in technical specification 3GPP TS 36.211 and have time duration of a single OFDM (Orthogonal Frequency Division Multiplex) symbol. In the uplink of LTE system a special type of OFDM, called DFTS-OFDM (Discrete Fourier Transform Spread OFDM), is used.

Sounding reference signals can be transmitted in the last symbol of a 1 ms uplink subframe. This is illustrated in FIG. 1 where a frame of 10 ms is shown. Each frame is divided into 10 subframes and one subframe can carry 12 or 14 symbols depending on whether a normal cyclic prefix or extended cyclic prefix is used. In LTE, the uplink symbols are DFTS-OFDM (Discrete Fourier Transform Spread-Orthogonal Frequency Division Modulation) symbols which also are referred to as SC-FDMA (Single Carrier-Frequency Division Multiple Access).

For the case with TDD, the sounding reference signals can also be transmitted in the special time slot called UpPTS, which is the uplink part of a special subframe. The special subframe further comprises a downlink part, DwPTS, and a guard period. The length of UpPTS can be configured to be one or two symbols. FIG. 2 shows an example for TDD with 3 downlink subframes, 2 uplink subframes within a 10 ms radio frame. Up to eight symbols may be set aside for the sounding reference signals.

The configuration of SRS symbols, such as SRS bandwidth, SRS frequency domain position, SRS hopping pattern and SRS subframe configuration are set semi-statically as a part of RRC information element defined in the technical specification 3GPP TS 36.331. There are in fact two different configurations: (1) Cell specific SRS configuration, which is further described in 3GPP TS 36.211; and (2) UE specific configuration, which is further described in 3GPP TS 36.213.

The cell specific configuration indicates to all UEs in a cell in which subframe the last symbol of the subframe, or the special slot referred to as UpPTS, can be used for sounding.

In normal uplink subframes, PUSCH (Physical Uplink Shared Channel) transmission which overlaps in the frequency domain with a cell specific subframe will be shortened in the sense that the last uplink symbol is not used for data transmission in the uplink. Furthermore, in subframes where cell specific SRS resources have been reserved, terminals in the cell should use shortened PUCCH (physical Uplink Control Channel) format when transmitting ACK/NACK or scheduling requests, which is referred to as formats 1a/1b/1. The shortened PUCCH format implies that the last symbol in the subframe is not used for transmission of control information. There are also certain rules that should be applied when the UE shall transmit the SRSs. For example, the UE shall not transmit an SRS in a subframe where a CQI (channel quality indication) report using PUCCH format 2 is transmitted.

The UE specific configuration is as the name indicates UE specific and indicates to the terminal a pattern of subframes and frequency domain resources to be used for the SRS. The UE specific configuration also indicates other parameters that the UE shall use when transmitting the SRS, such as frequency domain comb and cyclic shift.

This means that SRSs from different terminals can be multiplexed in the time domain, by transmitting the SRS in different subframes. Furthermore, within the same symbol, sounding reference signals can be multiplexed in the frequency domain. The set of subcarriers is divided into two sets of subcarriers, or combs with the even and odd subcarriers respectively in each such set. Additionally, the UEs may have different bandwidth to get additional Frequency Division Multiplexing (FDM). The comb enables frequency domain multiplexing of signals with different bandwidths and also overlapping. Additionally code division multiplexing (CDM) can be used. Then different users can use exactly the same time and frequency domain resources by using different shifts of a basic base sequence. An example illustrating the multiplexing possibilities is given in FIG. 3 where it is shown how SRS from different users can be multiplexed in the frequency domain and the time domain.

In LTE Rel-8/Rel-9, resources for transmission of sounding reference signals are reserved on a cell level by higher layers. Users in a cell are then semi-statically configured to transmit sounding reference signals using the resources reserved in the cell. When resources are reserved for sounding, they are taken from the cell and hence from all user in the cell. As a result regardless of whether there is a need for the UEs to sound the channel or not, the resources are taken from all users and can not be used for data transmission.

In a cell with a certain number of users, the period of SRS transmission is specified by the number of users and the bandwidth of SRS. When a large number of users share the SRS resources, the SRS period might become too large for some users, such as users with fast changing channels who need more frequent update from their channels, while for some other users this period may be too frequent.

SUMMARY

It can be noted that semi-static configuration of SRS transmission is inflexible, in a sense that resources can not be prioritized according to the current needs of a UE. It is therefore an aim of the embodiments of the present invention to provide a more flexible configuration of SRS transmission.

This is achieved by dynamically triggering a mobile terminal to transmit SRS. Thus, embodiments of the invention allow dynamically trigged SRS in any uplink subframe, even without necessarily reserving resources semi-statically on cell level. This is done by signaling to the terminal whether the mobile terminal should leave a predefined uplink symbol empty for sounding reference signals or use it for data transmission. In case a terminal leaves the predefined uplink symbol empty for sounding reference signals, there are two possibilities, either the UE shall transmit one or several reference signals from one or several antennas, or the terminal shall leave the predefined uplink symbol blank since another terminal may be using the resource for sounding.

Accordingly, in a specific embodiment, there are at least three different messages that can be conveyed to the terminal: use the predefined uplink symbol for data, leave it blank or use it for sounding reference signals.

According to a first aspect of embodiments of the present invention, a method in a base station for dynamically triggering a mobile terminal to transmit SRS is provided. A predefined uplink symbol of an uplink subframe is configured to be used by the mobile terminal for SRS. In the method, it is determined whether the mobile terminal shall use the predefined uplink symbol for data transmission or not during uplink transmission. It is then signaled to the mobile terminal instruction whether the mobile terminal shall use the predefined uplink symbol for data transmission or not during uplink transmission. The signaled instruction further comprises information whether the mobile terminal shall use the predefined uplink symbol for SRS or leave the predefined uplink symbol blank if the predefined uplink symbol shall not to be used for data transmission.

According to a second aspect of embodiments of the present invention, a method in a mobile terminal for dynamically transmitting SRS is provided. A predefined uplink symbol of an uplink subframe is configured to be used by the mobile terminal for SRS. In the method, the mobile terminal receives instruction whether the mobile terminal shall use the predefined uplink symbol for data transmission or not during uplink transmission. The received instruction further comprises information whether the mobile terminal shall use the predefined uplink symbol for SRS or leave the predefined uplink symbol blank if the predefined uplink symbol shall not to be used for data transmission. In subsequent steps the mobile terminal determines whether to send data or not in the predefined uplink symbol based on the received instruction, and transmits in the uplink according to said determination.

According to a third aspect of embodiments of the present invention a base station for dynamically triggering a mobile terminal to transmit SRS is provided. A predefined uplink symbol of an uplink subframe is configured to be used by the mobile terminal for SRS. The base station comprises a processor configured to determine whether the mobile terminal shall use the predefined uplink symbol for data transmission or not during uplink transmission, and a transmitter configured to signal to the mobile terminal instruction whether the mobile terminal shall use the predefined uplink symbol for data transmission or not during uplink transmission. The signaled instruction further comprises information whether the mobile terminal shall use the predefined uplink symbol for SRS or leave the predefined uplink symbol blank if the predefined uplink symbol shall not to be used for data transmission.

According to a fourth aspect of embodiments of the present invention, a mobile terminal for dynamically transmitting SRS is provided. A predefined uplink symbol of an uplink subframe is configured to be used by the mobile terminal for SRS. The mobile terminal comprises a receiver configured to receive instruction whether the mobile terminal shall use the predefined uplink symbol for data transmission or not during uplink transmission. The received instruction further comprises information whether the mobile terminal shall use the predefined uplink symbol for SRS or leave the predefined uplink symbol blank if the predefined uplink symbol shall not to be used for data transmission. The mobile terminal further comprises a processor configured to determine whether to send data or not in the predefined uplink symbol based on the received instruction, and a transmitter configured to transmit in the uplink according to said determination.

An advantage with embodiments of the present invention is that it is possible to achieve flexibility in using SRS whenever it is needed. Thus any uplink subframe can be used for SRS, not only subframes in which SRS resources are reserved semi-statically.

A further advantage with embodiments of the present invention is that user-based SRS assignment is provided, which is more fair towards users with no need for SRS transmission.

A yet further advantage with embodiments of the present invention is that it is avoided to reserve resources for SRS when no need for SRS exists. That implies that more resources for SRS can be given to those mobile terminals that need to send SRS more frequently.

Other objects, advantages and novel features of the invention will become apparent from the following detailed description of the invention when considered in conjunction with the accompanying drawings and claims.

BRIEF DESCRIPTION OF THE DRAWINGS

FIG. 10 is a logic flow diagram of a method in a base station according to one or more embodiments.

FIG. 11 is a logic flow diagram of a method in a mobile terminal according to one or more embodiments.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

The present invention is exemplified in the following non-limiting description of embodiments of the invention. Moreover, the following embodiments are described in the context of an LTE network but the embodiments of the present invention can also be applied in other networks.

Figure 4:
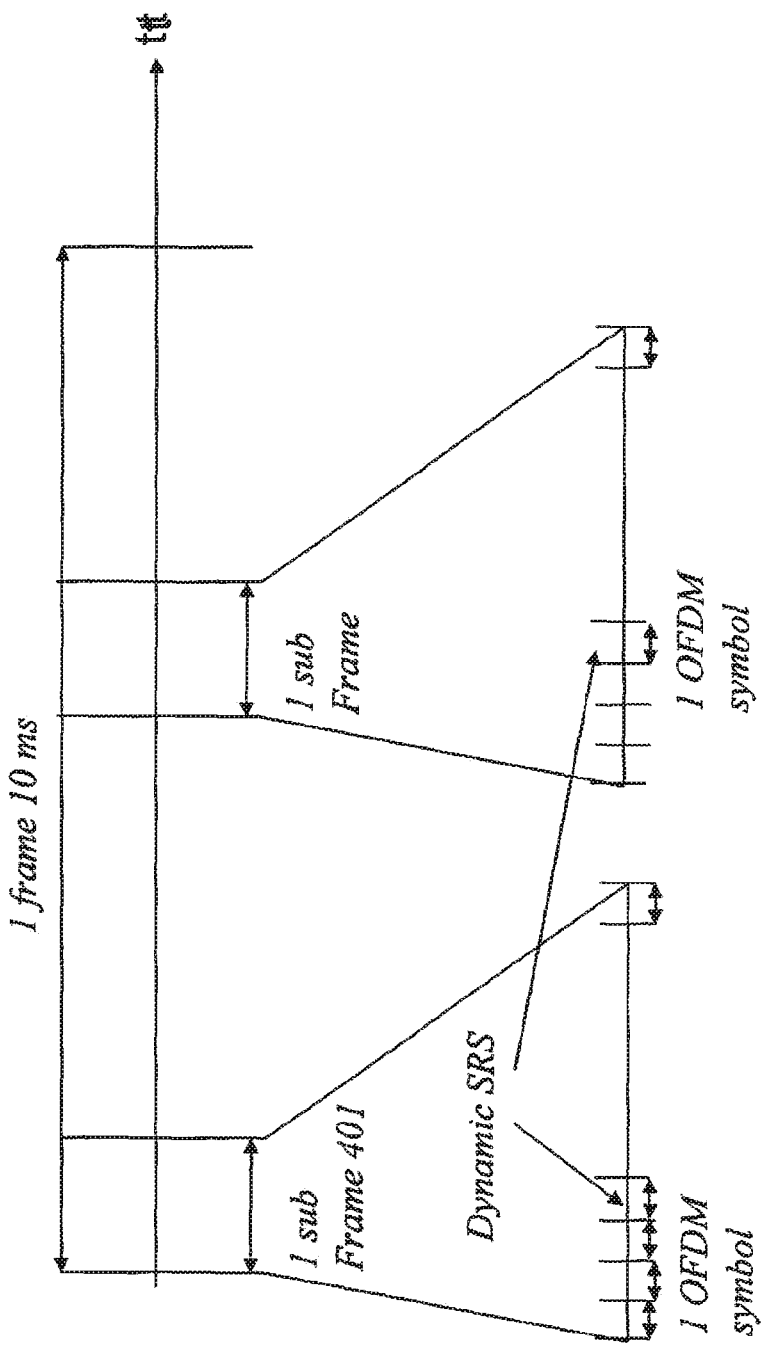
FIG. 4 illustrates an example of using a fourth symbol in a subframe for sounding reference signal transmission.

It should also be noted that although a predefined uplink symbol to be used for SRS transmission is exemplified as the last symbol, the predefined uplink symbol could be any predefined uplink symbol in a subframe. In FIG. 4, the fourth symbol is exemplified as the predefined uplink symbol. In addition since the embodiments of the invention are exemplified in the context of LTE, the uplink symbols are DFTS-OFDM uplink symbols. It should however be understood by a person skilled in the art that the embodiments of the present invention are not limited to DFTS-OFDMA.

As stated above, in existing LTE networks e.g. LTE release 8/9, SRS is transmitted over a semi-statically assigned bandwidth and periods. In future networks the number of UE antennas per user will increase, which implies that the resources for SRS become scarcer. This requires a more efficient management of the available resources for SRS and more importantly to avoid reserving resources which are only seldom used.

In addition, depending on the time-variation and frequency selectivity of the channels as well as due to the burstiness of the traffic, some UEs or some antennas of a UE may need to get a more frequent update of their channels than other. However, there is typically only a need for SRS when there is traffic to be transmitted in accordance to the traffic burstiness.

To address the need for more flexible SRS configuration, methods and arrangements for dynamically configuring SRS transmission based on the current situation are provided. By using embodiments of the present invention dynamic UE specific SRS configuration can be done on any subframe.

Figure 5:
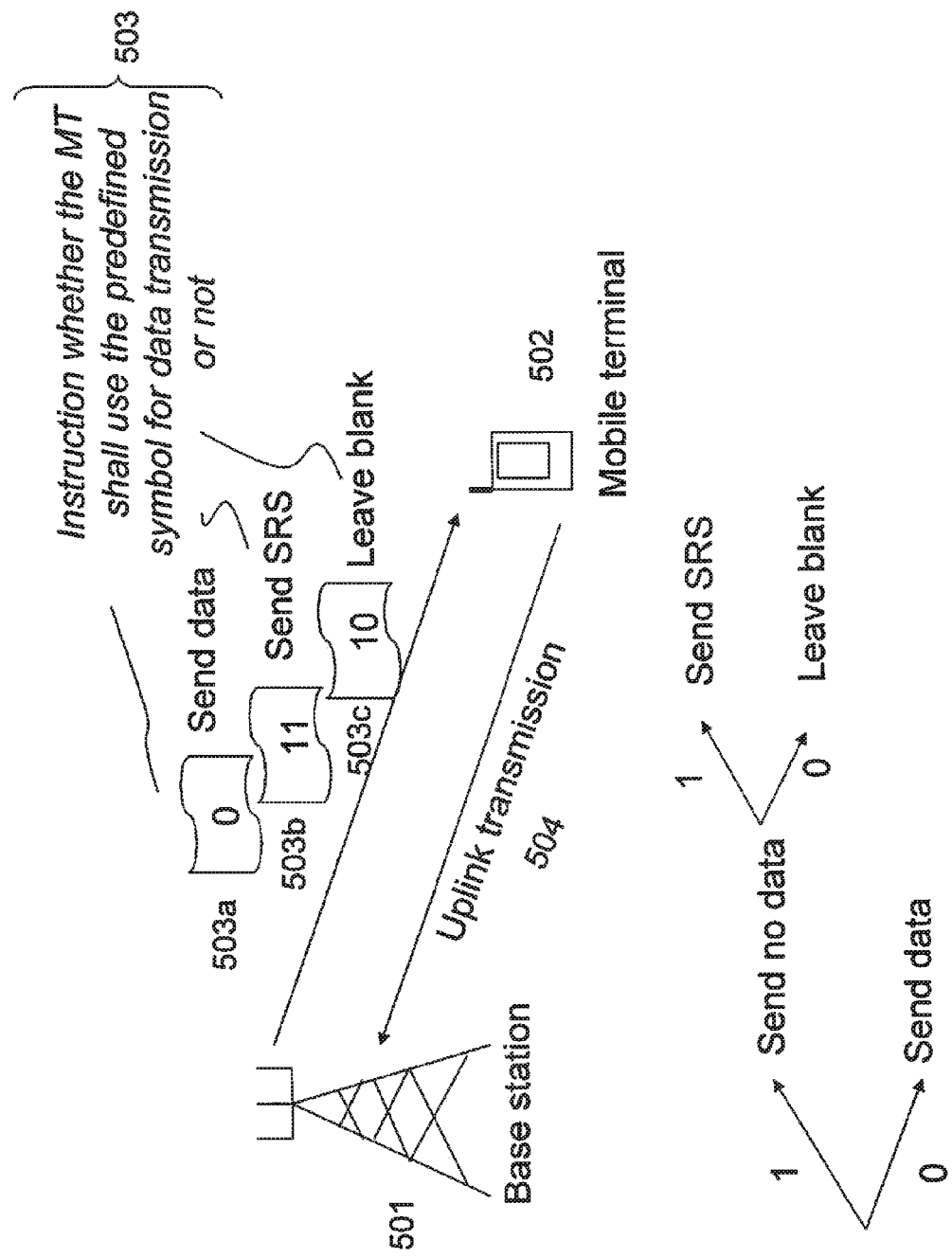
FIG. 5 is a block diagram of a base station configured to dynamically trigger a mobile terminal to transmit sounding reference signals according to one or more embodiments.

FIG. 5 illustrates an embodiment of the present invention. The base station 501 of FIG. 5 is configured to dynamically trigger the mobile terminal 502 to transmit sounding reference signals (SRS) wherein a predefined uplink symbol, such as an DFTS-OFDM symbol, of an uplink subframe is configured to be used by the mobile terminal for SRS. That is achieved by the base station 501 by determining whether the mobile terminal shall use the predefined uplink symbol for data transmission or not during uplink transmission. In situations when the channel changes rapidly e.g. due to time-variation and frequency selectivity of the channel and when the traffic is bursty, SRS transmission is required more frequently than in other situations. Thus, this is taken into account when the base station determines whether the mobile terminal shall use the predefined uplink symbol for data transmission or not during uplink transmission. Then the base station 501 signals 503 to the mobile terminal instruction whether the mobile terminal shall use the predefined uplink symbol for data transmission or not during uplink transmission. The signaled instruction further comprises information whether the mobile terminal shall use the predefined uplink symbol for SRS or leave the predefined uplink symbol blank if the predefined uplink symbol shall not to be used for data transmission. As illustrated in FIG. 5, the signaled instruction of "0" 503a implies send data, "11" 503b implies send SRS and "10" 503c implies that the predefined uplink symbol should be left blank. Based on the received instruction 503, the mobile terminal configures its uplink transmission accordingly 504.

Hence, three cases of dynamic SRS configurations need to be signaled to the UEs. In the first alternative, the base station signals to the mobile terminal to not puncture the data on the predefined uplink symbol, i.e. to send data. In the second alternative, the base station signals information to the mobile terminal to puncture the data on the predefined uplink symbol, i.e. to send no data, and this information comprises further to send SRS according to the second alternative and to leave the predefined uplink symbol blank according to the third alternative. To signal these three alternatives, only two bits are enough as shown in FIG. 5.

It should be noted that there is no need to have a hierarchical structure when composing the instruction as illustrated in FIG. 5, but that there are at least three different messages that can be sent from the base station to the mobile terminal. Furthermore, it is also possible to envision that the mobile terminal is configured with a set of different SRS parameters so that different messages can be used to transmit SRS parameters, for example of different bandwidths or with different positions in the frequency domain. To exemplify, the instruction signaled to the mobile terminal may comprise the following alternatives: (1) Transmit data on PUSCH also in the predefined uplink symbol; (2) Do not transmit any data on PUSCH in the predefined uplink symbol, leave it empty; (3) Do not transmit any data on PUSCH in the predefined uplink symbol. Instead, transmit an SRS in the predefined uplink symbol with bandwidth b1, comb c1, cyclic shift s1 and frequency domain starting position f1; and (4) Do not transmit any data on PUSCH in the predefined uplink symbol. Instead, transmit an SRS in the last symbol with bandwidth b2, comb c2, cyclic shift s2 and frequency domain starting position f2.

Turning now to FIG. 10 and FIG. 11, where flowcharts of the methods in the base station and the mobile terminal, respectively, are illustrated. As shown in FIG. 10 a method in a base station for dynamically triggering a mobile terminal to transmit SRS is provided. A predefined uplink symbol of an uplink subframe is configured to be used by the mobile terminal for SRS. In a first step the base station determines 301 whether the mobile terminal shall use the predefined uplink symbol for data transmission or not during uplink transmission. In a next step, the base station signals 302 to the mobile terminal instruction whether the mobile terminal shall use the predefined uplink symbol for data transmission or not during uplink transmission. The signaled instruction further comprises information whether the mobile terminal shall use the predefined uplink symbol for SRS or leave the predefined uplink symbol blank if the predefined uplink symbol shall not to be used for data transmission.

A method in a mobile terminal for dynamically transmitting SRS is shown in FIG. 11. As stated above, a predefined uplink symbol of an uplink subframe is configured to be used by the mobile terminal for SRS. The mobile terminal receives 310 instruction whether the mobile terminal shall use the predefined uplink symbol for data transmission or not during uplink transmission. The received instruction further comprises information whether the mobile terminal shall use the predefined uplink symbol for SRS or leave the predefined uplink symbol blank if the predefined uplink symbol shall not to be used for data transmission. The mobile terminal interprets the received instruction to determine 311 whether to send data or not in the predefined uplink symbol based on the received instruction, and transmits 312 the SRS in the predefined uplink symbol according to said determination.

The instruction signaled from the base station and received at the mobile terminal may either be valid for the predefined uplink symbol of one subsequent uplink subframe or for the predefined uplink symbol of multiple subsequent uplink subframes.

The predefined uplink symbol may by default be used for data transmission, or by default be used for SRS. If the predefined uplink symbol is by default used for SRS, by the current mobile terminal, or by other mobile terminals wherein the predefined uplink symbol is left blank by the current mobile terminal, the signaling 302 to the mobile terminal is performed if the predefined uplink symbol should be used for data transmission. Whether the current mobile terminal should send SRS or leave it blank such that the predefined uplink symbol can be used by other mobile terminals, can be instructed by the base station.

However, if the predefined uplink symbol is by default used for data transmission, the signaling 302 to the mobile terminal is performed if the predefined uplink symbol should not be used for data transmission, which implies that the signaled instruction from the base station to the mobile station comprises information whether the mobile terminal should send SRS or leave it blank for other mobile terminals.

Figure 12:
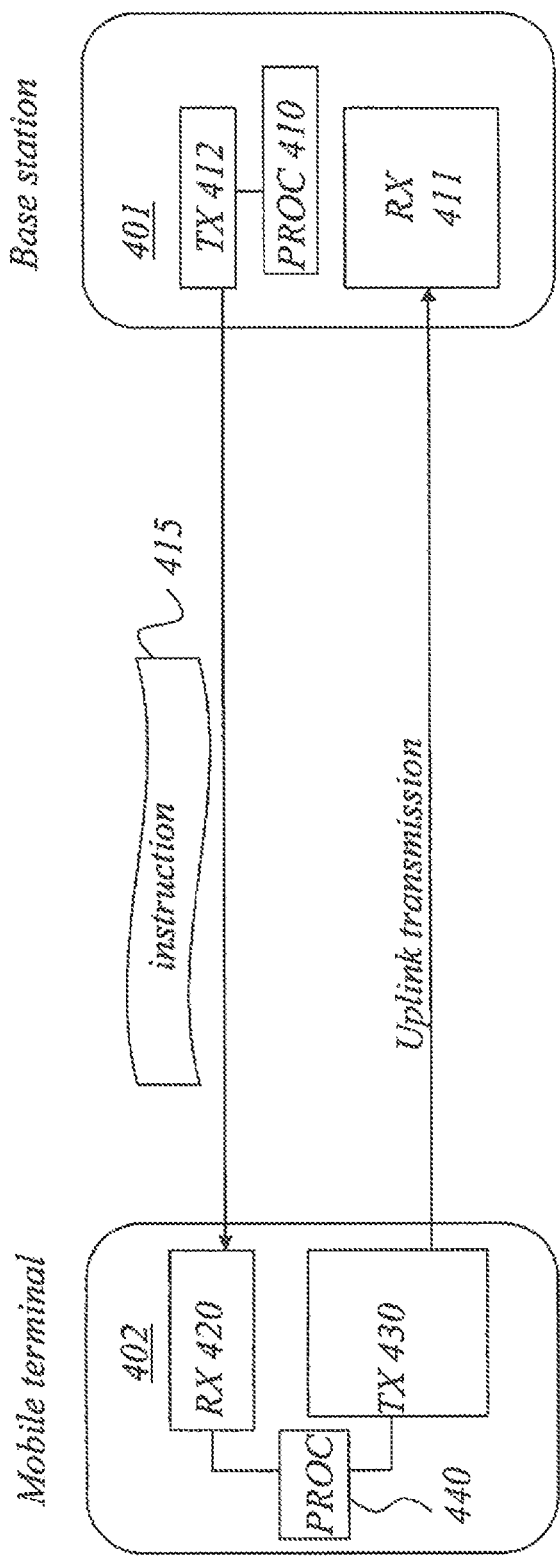
FIG. 12 is a block diagram of a base station and a mobile terminal configured according to one or more embodiments.

Accordingly, with reference to FIG. 12, the base station 401 comprises a processor 410 configured to determine whether the mobile terminal 402 shall use the predefined uplink symbol for data transmission or not during uplink transmission, and a transmitter 412 configured to signal to the mobile terminal 402 instruction 415 whether the mobile terminal 402 shall use the predefined uplink symbol for data transmission or not during uplink transmission. The signaled instruction 415 further comprises information whether the mobile terminal shall use the predefined uplink symbol for SRS or leave the predefined uplink symbol blank if the predefined uplink symbol shall not to be used for data transmission. In addition, the base station comprises a receiver 411 for receiving the uplink transmission from the mobile terminal 402.

According to an embodiment of the present invention, the transmitter 412 is configured to signal to the mobile terminal the instruction 415 as downlink control information carried by the physical downlink control channel.

Moreover, the mobile terminal comprises a receiver 420 configured to receive instruction 415 whether the mobile terminal 402 shall use the predefined uplink symbol for data transmission or not during uplink transmission. The received instruction further comprises information whether the mobile terminal 402 shall use the predefined uplink symbol for SRS or leave the predefined uplink symbol blank if the predefined uplink symbol shall not be used for data transmission. The mobile terminal 402 further comprises a processor 440 configured to determine whether to send data or not in the predefined uplink symbol based on the received instruction, and a transmitter 430 configured to transmit the SRS in the predefined uplink symbol according to said determination.

In accordance with one embodiment of the present invention, the receiver 420 is configured to receive the instruction 415 as downlink control information carried by the physical downlink control channel.

In case of dynamic configuration, the information whether the mobile terminal shall use the predefined uplink symbol for data transmission or not during uplink transmission e.g. sent in an uplink scheduling grant which is part of downlink control information (DCI) format 0. The DCI is carried by physical downlink control channel (PDCCH), which is sent over the 1-4 OFDM symbols in each subframe. This means that the dynamic of SRS configuration can have a resolution as high as every subframe.

The dynamically configured reference signals according to embodiments of the present invention can for example be mapped to every second subcarrier in the frequency domain, as in the case for the sounding reference signals defined for Release 8/9 in LTE using a so called repetition factor of 2, or be mapped to every subcarrier, which is the case with the uplink demodulation reference signals for Release 8/9 in LTE. SRSs associated with different mobile terminal antennas may be code division multiplexed using different cyclic shifts of a certain sequence, such as a Zadoff Chu sequence.

Figure 1:
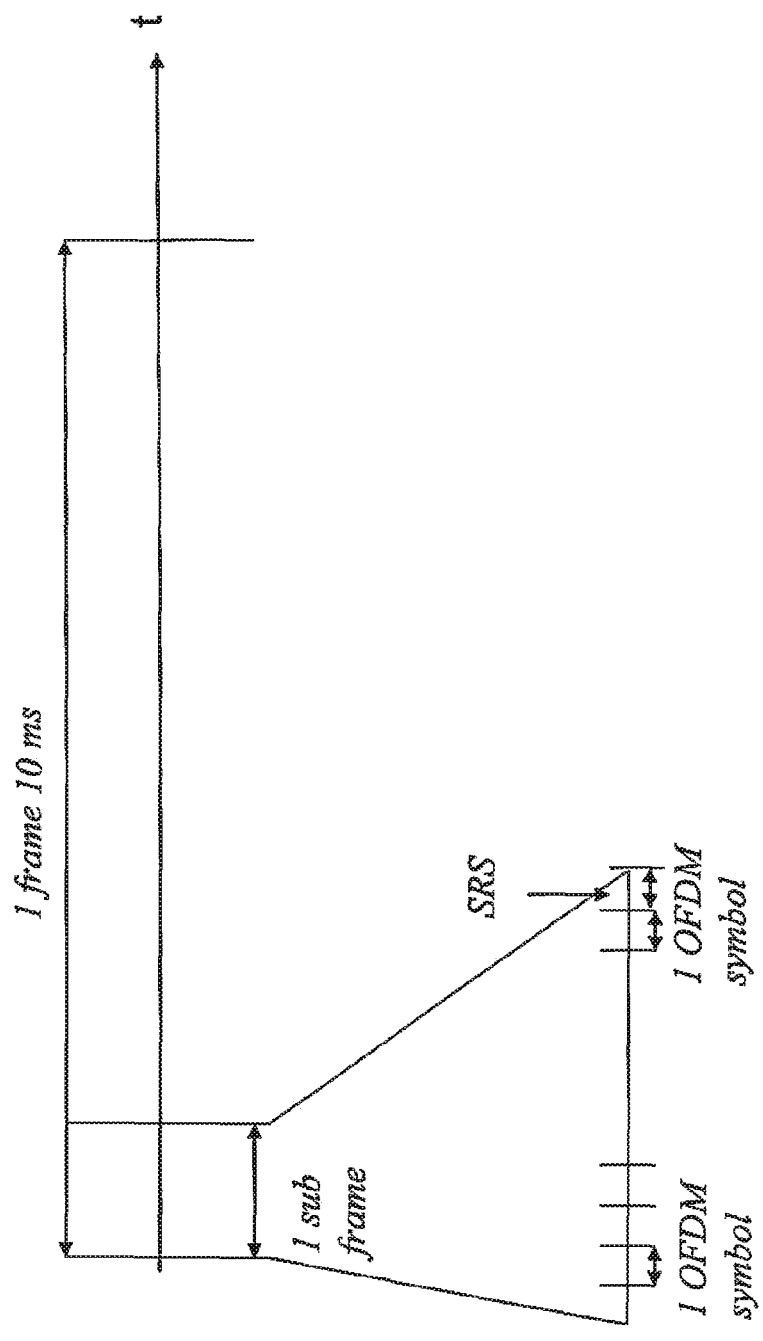
FIG. 1 illustrates a frame in which a sounding reference signal is transmitted.
Figure 2:
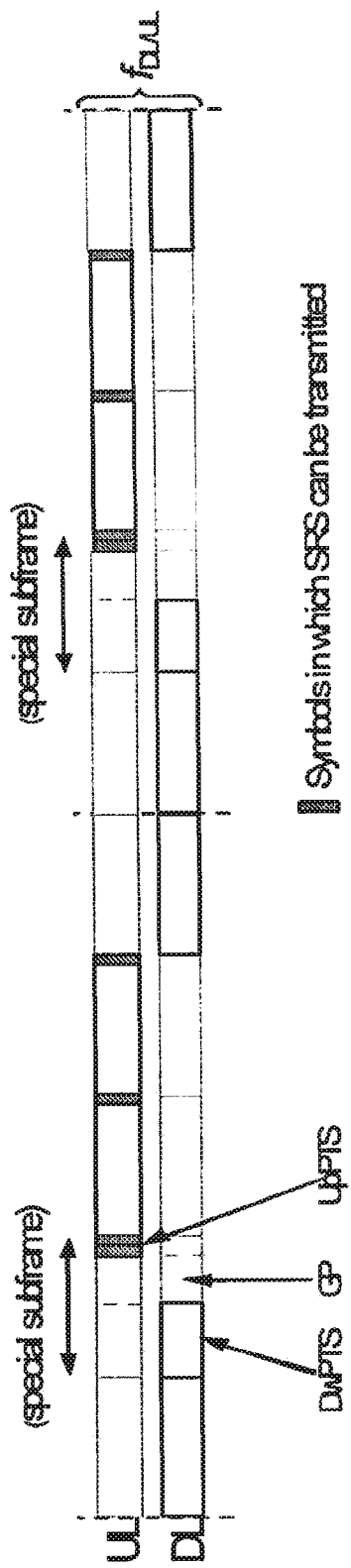
FIG. 2 illustrates an example of a frame for time division duplexing (TDD).
Figure 3:
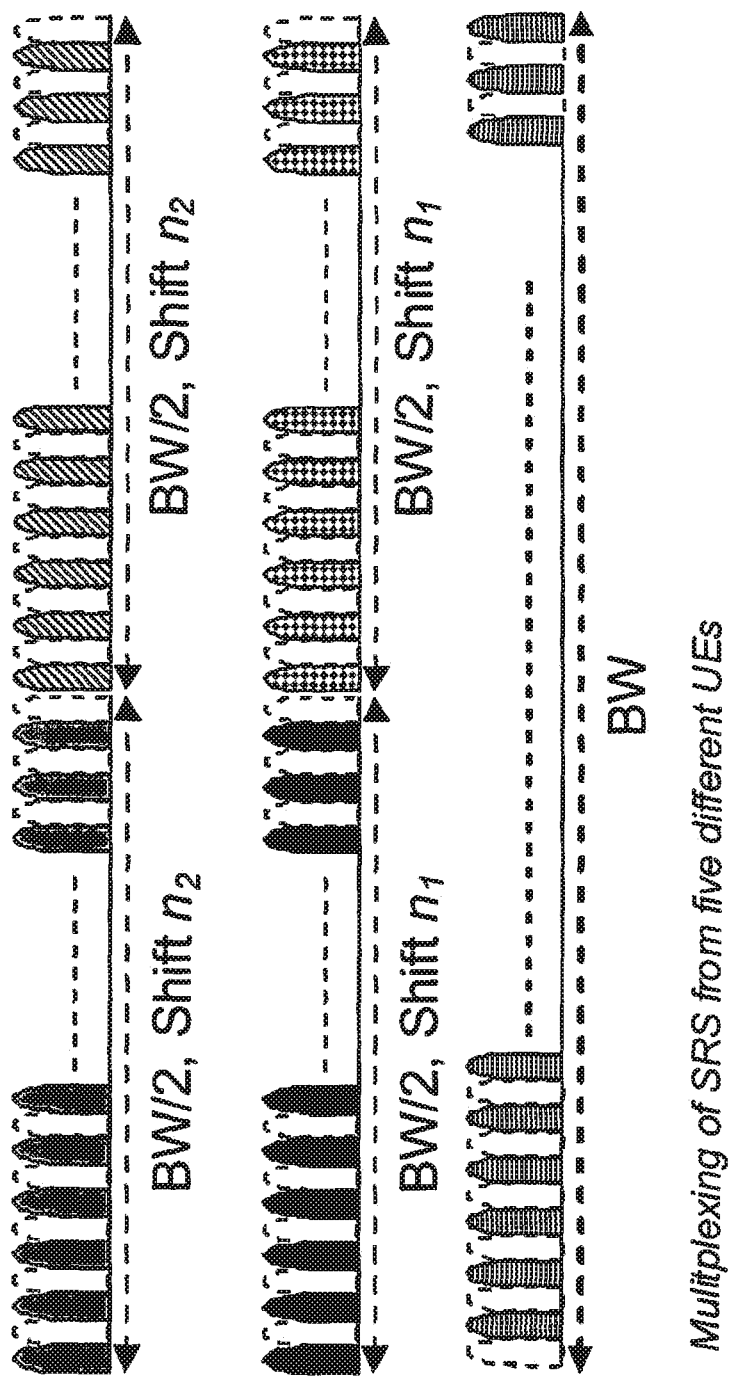
FIG. 3 illustrates an example of multiplexing sounding reference signals from different users in the frequency domain and the time domain.

For LTE, a 10 ms radio frame is divided into ten subframes with duration of 1 ms, and in each 1 ms subframe, 12 or 14 DFTS-OFDM symbols are transmitted depending on whether normal or extended cyclic prefix length is used as illustrated in FIGS. 1 and 4. As stated above, the dynamically configured SRSs does not have to be transmitted in the last uplink symbol of subframe, but the symbol can be predefined as well as dynamically or semi-statically configured in any of the uplink symbols. It should also be noted that not only one uplink symbol but several uplink symbols can be used.

The dynamically configured SRS according to embodiments of the present invention can be self-contained, which implies that the SRS is transmitted within the resources assigned for data transmission, i.e. PUSCH resources. Also, RRM (Radio Resource Management) parameters may be configured such that the configuration parameters for the dynamic SRS of the invention can be the same as the ones for periodic SRS transmission and the configuration can be done semi-statically as a part of RRC (Radio Resource Control) information elements.

Thanks to the dynamically configured aperiodic SRS provided by embodiments of the present invention, SRS transmissions can be requested when there is a need for sounding. The base station is then able to dynamically request transmission of an SRS in a certain subframe. For example that can be done as part of an uplink grant so that the SRS is transmitted in the same subframe as the data. The signaled instruction may comprise parameters which can be semi-statically configured and may also be a function of the subframe, be partially determined by the PUSCH allocation, or be partially dynamically signaled in the uplink grant.

However, if the cell specific resource has not been reserved, other users may transmit data in the predefined uplink symbol of the subframe, and this would then collide with the SRS transmission. Hence according to embodiments of the invention, the mobile terminal can also be dynamically instructed to leave the last symbol empty to allow for another mobile terminal to transmit an SRS without any overlap.

In another case, the cell may have reserved resources, e.g. the last symbol, for SRS, and this means that existing mobile terminals, e.g. LTE release 8/9 UEs, must leave the last symbol empty and hence less symbols can be used for data transmission. At the same time, a mobile terminal according to the present invention could, if instructed by the base station, use these resources for data transmission. The allocation of the SRS resources is under the control of the base station which knows if SRS will be transmitted from any users in the cell. Thus when dynamic SRS is configured in a subframe, the base station instructs one mobile terminal to send SRS, and at the same time instructs the other mobile terminals that send data on the designated SRS resources to puncture their data, i.e. to not transmit data.

Figure 6:
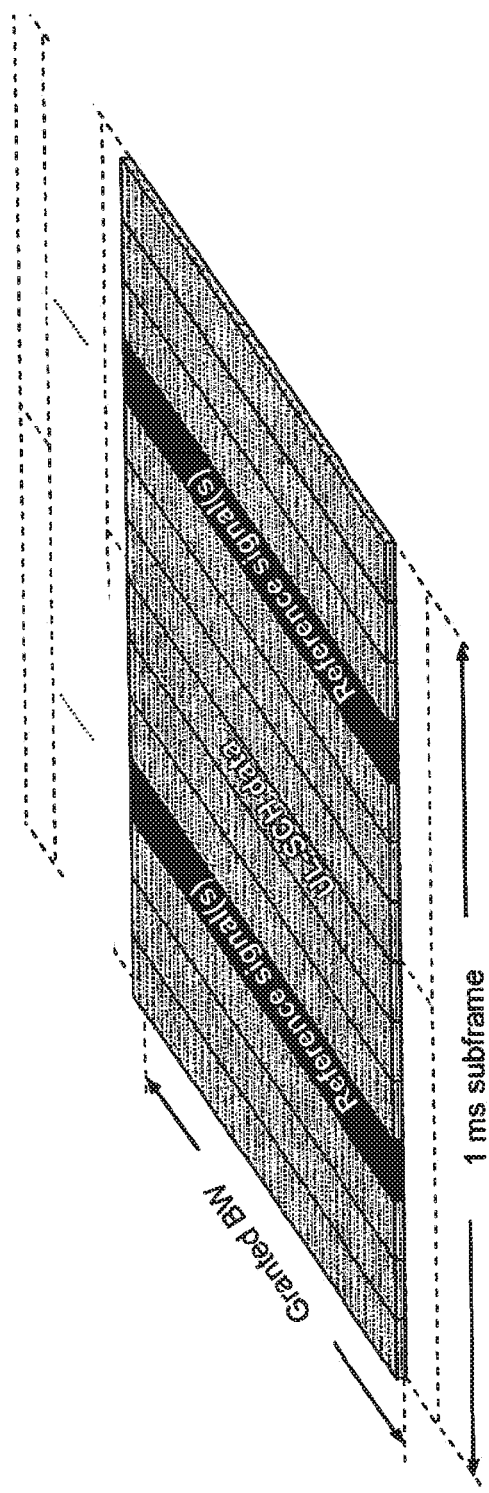
FIG. 6 illustrates an example of using a predefined uplink symbol for data transmission according to one or more embodiments.

FIG. 6, shows the uplink transmission 504 (of FIG. 5) when the predefined uplink symbol should be used for data transmission according to a first alternative (corresponding to 503a of FIG. 5). The black symbols indicated as reference signals denote other reference signals than SRS and these other reference signals are used in all uplink transmission. Accordingly, FIG. 6 shows the case of PUSCH transmission when there is no additional transmission of SRS according to prior art, and the case when the mobile terminal is dynamically instructed to use the predefined uplink symbol for data transmission according to embodiments of the present invention.

Figure 7:
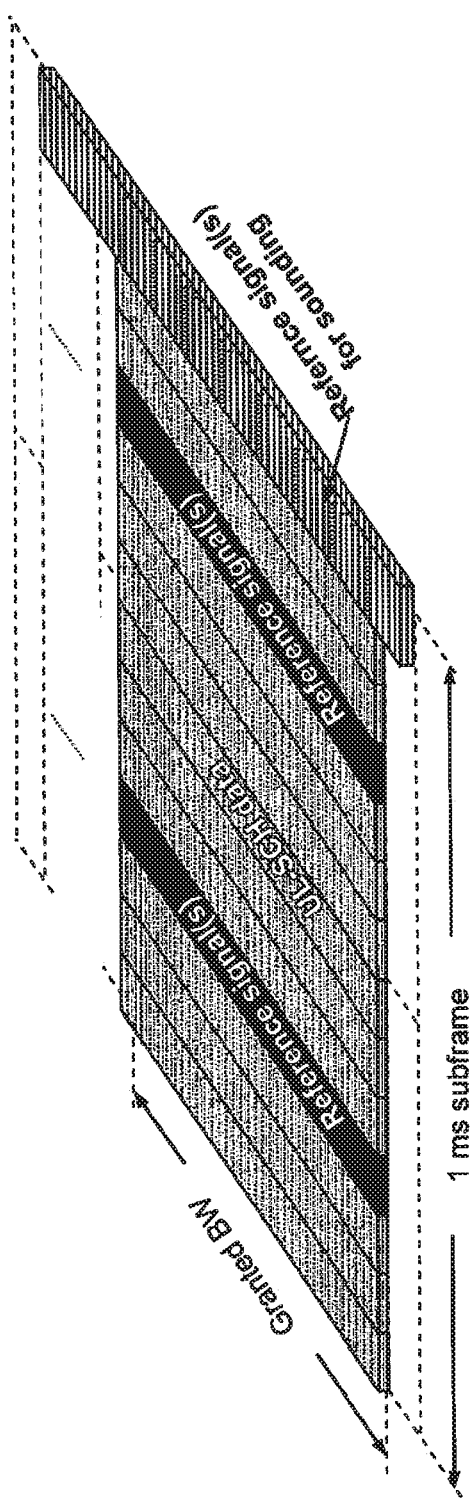
FIG. 7 illustrates an example of a mobile terminal transmitting additional sounding reference signals according to one or more embodiments.

Further according to a second alternative (corresponding to 503b of FIG. 5), when the mobile terminal is to transmit additional SRS, for example when the mobile terminal is instructed to do so dynamically e.g. by means of an indicator in the uplink scheduling grant according to technical specification 3GPP TS 36.212 transmitted in a downlink subframe at least three subframes earlier. The transmission of the additional SRS is illustrated in FIG. 7.

Figure 8:
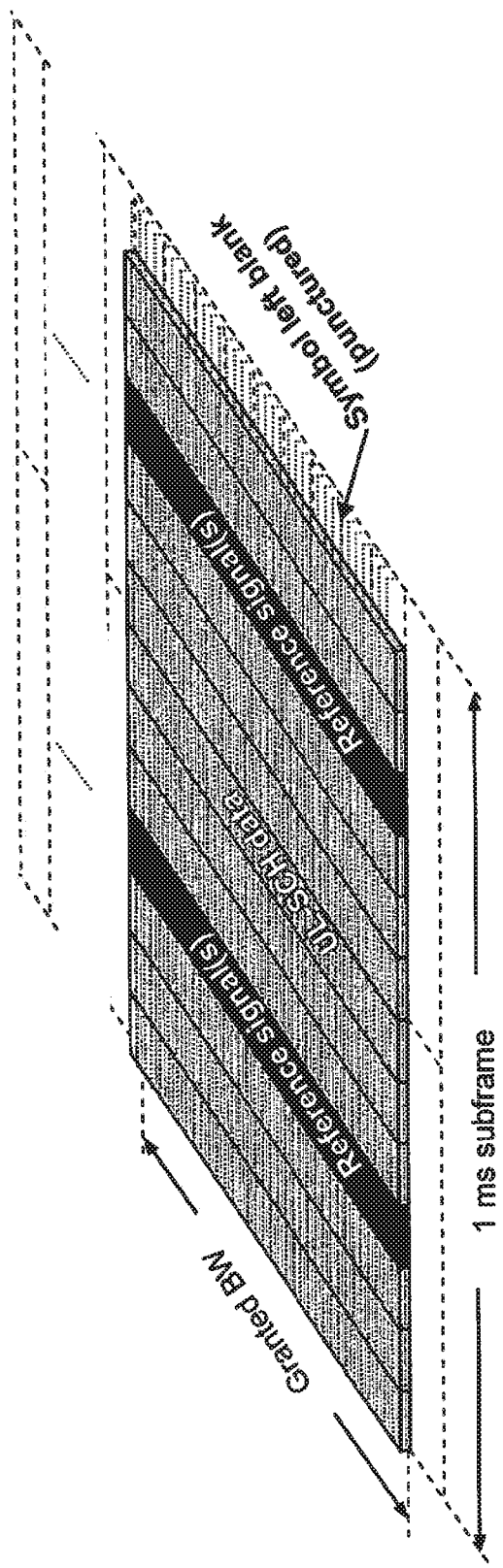
FIG. 8 illustrates an example of a mobile terminal leaving a predefined uplink symbol blank according to one or more embodiments.

According to a third alternative (corresponding to 503c of FIG. 5), the mobile terminal is instructed to leave the predefined uplink symbol blank, so that another mobile terminal can use the resources for transmitting SRS. The transmission is illustrated in FIG. 8.

Figure 9:
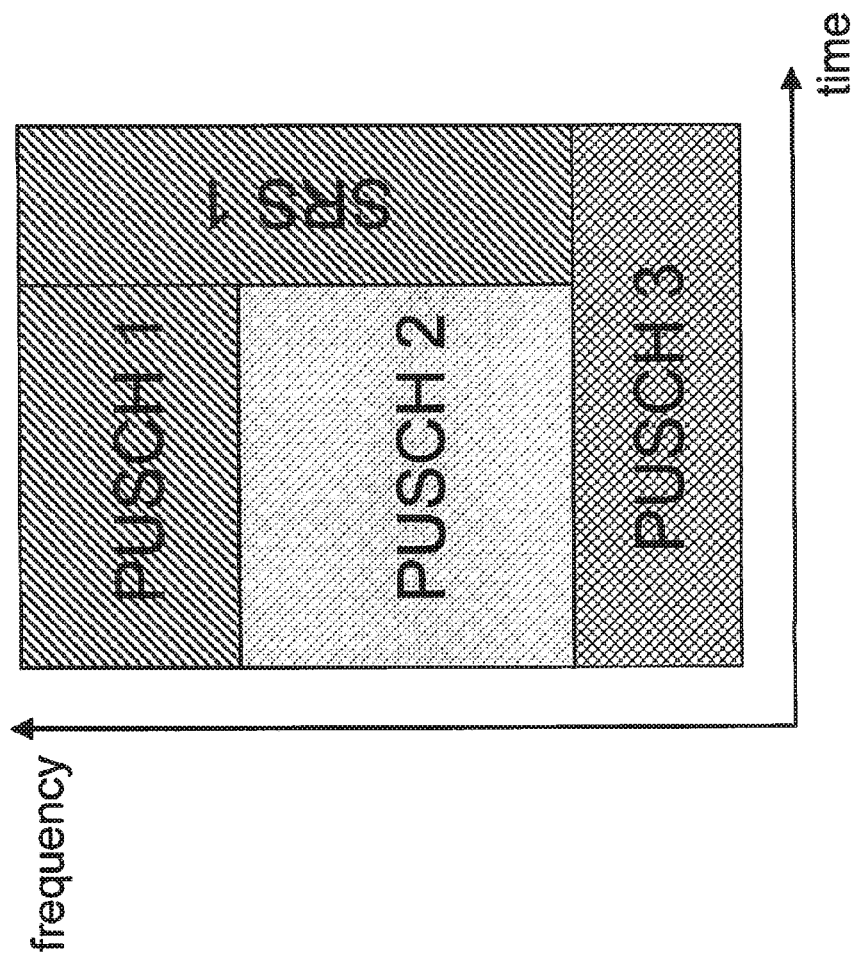
FIG. 9 illustrates an example of mobile terminal uplink scheduling according to one or more embodiments.

Turning now to FIG. 9 which provides an example to further describe the embodiments of the present invention. In the example, three mobile terminals are scheduled within one uplink (UL) subframe and dynamic SRS transmission is configured for mobile terminal 1 on the PUSCH, denoted as PUSCH 1, where the bandwidth of SRS transmission for mobile terminal 1, denoted as SRS 1, covers the total bandwidth of mobile terminal 1 plus the bandwidth of the mobile terminal 2. In this case the mobile terminal 1 needs to puncture its data and to insert SRS 1 at the end, the mobile terminal 2 has to puncture its data, and the mobile terminal 3 can continue its normal operation as instructed by the base station e.g. by means of the UL scheduling grant. FIG. 9 illustrates the structure of the data and the SRS.

Note that puncturing here is to be understood that data is not transmitted. This means the code rate or the transport block size can be adapted as well. The main meaning is that no data is transmitted in the predefined uplink symbol which instead e.g. can be used for SRS.

It should also be noted that the SRSs can be mapped to every second subcarrier in the frequency domain, as is the case for the sounding reference signals defined for Release 8/9 in LTE using a so called repetition factor of two, or be mapped to every subcarrier, as is the case with the uplink demodulation reference signals for Release 8/9 in LTE.

The present invention may be carried out in other ways than those specifically set forth herein without departing from essential characteristics of the invention. The embodiments described are to be considered in all respects as illustrative and not restrictive.

What is claimed is:

1. A method implemented by a base station in a communications network, the method comprising:
broadcasting a cell-specific instruction to a plurality of mobile terminals in a cell served by the base station, the cell-specific instruction indicating that an uplink symbol in each of multiple subsequent subframes has been semi-statically configured for sounding reference signal (SRS) transmission;
determining that a first mobile terminal of the plurality of mobile terminals is to use the uplink symbol in a given one of the multiple subsequent subframes for aperiodic SRS transmission; and
in response to the determining, signaling a terminal-specific instruction to the first mobile terminal, the terminal-specific instruction being distinct from the cell-specific instruction and indicating that the first mobile terminal is to use the uplink symbol in the given subframe for aperiodic SRS transmission and not for data transmission.

2. The method of claim 1, wherein the base station semi-statically configures a first plurality of uplink symbols for periodic SRS transmission and a second plurality of uplink symbols for aperiodic SRS transmission.

3. The method of claim 1, wherein said signaling comprises signaling the terminal-specific instruction at least partially as downlink control information carried by a physical downlink control channel.

4. The method of claim 1, wherein the terminal-specific instruction is at least partially dynamically signaled in an uplink grant.

5. The method of claim 1, wherein the terminal-specific instruction is transmitted to the first mobile terminal at a first layer of a communications protocol stack used by the base station and the cell-specific instruction is broadcast to the mobile terminals in the cell at a second layer of said protocol stack, the first layer being lower in the protocol stack than the second layer.

6. A method implemented by a mobile terminal in a communications network, the method comprising:
receiving a cell-specific instruction indicating that an uplink symbol in each of multiple subsequent subframes has been semi-statically configured for sounding reference signal (SRS) transmission;
receiving a terminal-specific instruction, distinct from the cell-specific instruction, that indicates whether the uplink symbol in a given one of the multiple subsequent subframes is to be used by the mobile terminal for aperiodic SRS transmission and not for data transmission;
determining, based on the received terminal-specific and cell-specific instructions, whether to use the uplink symbol for aperiodic SRS transmission in the given subframe; and
transmitting according to a result of the determining.

7. The method of claim 6:
wherein the terminal-specific instruction indicates one of:
that the uplink symbol is to be used by the mobile terminal for aperiodic SRS transmission in the given subframe;
that the uplink symbol is to be left blank by the mobile terminal in the given subframe; and
wherein the determining comprises determining one of:
to use the uplink symbol for aperiodic SRS transmission in the given subframe;
to leave the uplink symbol blank in the given subframe.

8. The method of claim 6, wherein receiving the terminal-specific instruction comprises receiving the terminal-specific instruction as downlink control information carried by a physical downlink control channel.

9. The method of claim 6, wherein receiving the terminal-specific instruction comprises receiving the terminal-specific instruction at least partially in an uplink grant.

10. The method of claim 6:
wherein the mobile terminal is served by one of a plurality of cells in the communications network;
wherein receiving the cell-specific instruction comprises receiving a broadcast to at least one other mobile terminal served by the cell, the cell-specific instruction indicating to the at least one other mobile terminal that the uplink symbol in each of the multiple subsequent subframes has been semi-statically configured for SRS transmission.

11. The method of claim 6, wherein the terminal-specific instruction is received at a first layer of a communications protocol stack used by the mobile terminal and the cell-specific instruction is received at a second layer of said protocol stack, the first layer being lower in the protocol stack than the second layer.

12. The method of claim 6, wherein the network semi-statically configures a first plurality of uplink symbols for periodic SRS transmission and a second plurality of uplink symbols for aperiodic SRS transmission.

13. A base station for use in a communications network, the base station comprising:
a processor configured to determine that a first mobile terminal of a plurality of mobile terminals in a cell served by the base station is to use an uplink symbol in a given one of multiple subsequent subframes for aperiodic sounding reference signal (SRS) transmission; and
a transmitter configured to:
broadcast a cell-specific instruction to the plurality of mobile terminals, the cell-specific instruction indicating that the uplink symbol in each of the multiple subsequent subframes has been semi-statically configured for SRS transmission;
in response to the processor determining, signal a terminal-specific instruction to the first mobile terminal, the terminal-specific instruction being distinct from the cell-specific instruction and indicating that the first mobile terminal is to use the uplink symbol in the given subframe for aperiodic SRS transmission and not for data transmission.

14. The base station of claim 13, wherein the transmitter is configured to at least partially signal the terminal-specific instruction in an uplink grant.

15. The base station of claim 13, wherein the transmitter is configured to transmit the terminal-specific instruction at a first layer of a communications protocol stack used by the base station and to broadcast the cell-specific instruction at a second layer of said protocol stack, the first layer being lower in the protocol stack than the second layer.

16. A mobile terminal for use in a communications network, the mobile terminal comprising:
a receiver configured to:
receive a cell-specific instruction indicating that an uplink symbol in each of multiple subsequent subframes has been semi-statically configured for sounding reference signal (SRS) transmission;
receive a terminal-specific instruction, distinct from the cell-specific instruction, that indicates whether the uplink symbol in a given one of the multiple subsequent subframes is to be used by the mobile terminal for aperiodic SRS transmission and not for data transmission;
a processor configured to determine, based on the received terminal-specific and cell-specific instructions, whether to use the uplink symbol for aperiodic SRS transmission in the given subframe;
a transmitter configured to transmit according to a result of the determining.

17. The mobile terminal of claim 16:
wherein the terminal-specific instruction indicates one of:
that the uplink symbol is to be used by the mobile terminal for aperiodic SRS transmission in the given;
that the uplink symbol is to be left blank by the mobile terminal in the given subframe; and
wherein to determine whether to use the uplink symbol for aperiodic SRS transmission in the given subframe, the processor is configured to determine one of:
to use the uplink symbol of the given subframe for aperiodic SRS transmission in the given subframe;
to leave the uplink symbol blank in the given subframe.

18. The mobile terminal of claim 16, wherein the receiver is configured to receive the terminal-specific instruction at least partially in an uplink grant.

19. The mobile terminal of claim 16:
wherein the mobile terminal is served by one of a plurality of cells in the communications network;
wherein the cell-specific instruction has been broadcast to at least one other mobile terminal served by the cell, the cell-specific instruction indicating to the at least one other mobile terminal that the uplink symbol in each of multiple subsequent subframes has been semi-statically configured for SRS transmission.

20. The mobile terminal of claim 16, wherein the terminal-specific instruction is received at a first layer of a communications protocol stack used by the mobile terminal and the cell-specific instruction is received at a second layer of said protocol stack, the first layer being lower in the protocol stack than the second layer.

* * * * *